(12) United States Patent
Yaeger

(10) Patent No.: US 7,103,603 B2
(45) Date of Patent: Sep. 5, 2006

(54) METHOD, APPARATUS, AND SYSTEM FOR IMPROVED DUPLICATE RECORD PROCESSING IN A SORT UTILITY

(75) Inventor: Frank L. Yaeger, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/402,716

(22) Filed: Mar. 28, 2003

(65) Prior Publication Data

US 2004/0193570 A1    Sep. 30, 2004

(51) Int. Cl.
*G06F 17/30* (2006.01)

(52) U.S. Cl. .................. 707/101; 707/100; 707/102; 707/103 R; 707/104.1

(58) Field of Classification Search ................ 707/201, 707/100, 101, 102, 103 R, 104.1
See application file for complete search history.

(56) References Cited

U.S. PATENT DOCUMENTS

| | | | | |
|---|---|---|---|---|
| 4,949,251 A * | 8/1990 | Griffin et al. | ................. | 714/20 |
| 5,111,395 A | 5/1992 | Smith et al. | ................. | 364/408 |
| 5,241,648 A | 8/1993 | Cheng et al. | ................. | 395/600 |
| 5,303,149 A | 4/1994 | Janigian | .................. | 364/408 |
| 5,410,667 A * | 4/1995 | Belsan et al. | ................. | 711/114 |
| 5,437,026 A * | 7/1995 | Borman et al. | ............. | 707/202 |
| 5,487,164 A | 1/1996 | Kirchhofer et al. | ........ | 395/600 |
| 5,497,486 A | 3/1996 | Stolfo et al. | ................. | 395/600 |
| 5,717,915 A | 2/1998 | Stolfo et al. | ................. | 395/605 |
| 5,799,302 A * | 8/1998 | Johnson et al. | ................ | 707/7 |
| 5,937,401 A * | 8/1999 | Hillegas | ........................ | 707/2 |
| 5,937,415 A | 8/1999 | Sheffield et al. | ............ | 707/204 |
| 5,978,792 A | 11/1999 | Bhargava et al. | ............... | 707/2 |
| 6,061,503 A * | 5/2000 | Chamberlain | ............... | 709/217 |

(Continued)

FOREIGN PATENT DOCUMENTS

WO    WO 98/12669    3/1998

OTHER PUBLICATIONS

*Technique to generate very efficient compression/decompression engines for XML data streams based on the stream's DTD*, Research Disclosure, Feb. 2000, pp. 399-400.

(Continued)

*Primary Examiner*—Frantz Coby
(74) *Attorney, Agent, or Firm*—Kunzler & Associates

(57) ABSTRACT

A duplicate record processing method, apparatus, and system sorts a plurality of data records, identifies duplicate data records, and uses duplicate selection criteria to select at least one instance of the duplicate data records. The duplicate selection criteria may be specified by parameters contained within control statements. An instance is selected when initial duplicate selection criteria are met. The sort method saves initial data record selections and continues to process subsequent records. Records that meet duplicate selection criteria are saved over previously selected records. In response to determining that the last saved record meets the final duplicate selection criteria, the saved record is output. Records that are not selected may be deleted.

17 Claims, 8 Drawing Sheets

U.S. PATENT DOCUMENTS

| | | | |
|---|---|---|---|
| 6,081,805 A * | 6/2000 | Guha | 707/5 |
| 6,226,411 B1 | 5/2001 | Hiyoshi | 382/232 |
| 6,381,601 B1 * | 4/2002 | Fujiwara et al. | 707/7 |
| 6,801,915 B1 * | 10/2004 | Mack | 707/100 |
| 6,892,210 B1 * | 5/2005 | Erickson et al. | 707/201 |
| 2002/0099806 A1 * | 7/2002 | Balsamo et al. | 709/223 |
| 2003/0126156 A1 * | 7/2003 | Stoltenberg et al. | 707/104.1 |

OTHER PUBLICATIONS

V. Y. Lum, M. E. Senko and P. S. Yuen, *Sorting Method*, IBM Technical Disclosure Bulletin, vol. 15, No. 3 Aug. 1972, pp. 745-746.

*Efficient Cache Management*, Research Disclosure, Dec. 1998, pp. 1711.

* cited by examiner

```
            710   720       730  740 750 760 770  770
             )     )         )    )   )   )   )    )
700 →   SELECT FROM(Source) TO(Destination) ON(Position, Length, Format) Operator
```

710 ⌒ SELECT - Specifies selection operation

720 ⌒ *Source* - Source of Data Records

730 ⌒ *Destination* - Destination of Data Records

740 ⌒ ON - Specifies the position, length and format parameters of the data used by the selection operation 750 ⌒ *Position* - Starting Position of Field in Bytes 760 ⌒ *Length* - Length of Field in Bytes 770 ⌒ *Format* - Format of Field
       CH - Character
       CSF - Signed Numeric with optional leading floating sign
       FS - Signed Numeric with optional leading floating sign
       ZD - Signed Zoned Decimal
       PD - Signed Packed Decimal
       FI - Signed Fixed Point
       BI - Unsigned Binary
       AC - ASCII Character 780 ⌒ *Operator* - Conditional Operator
       FIRSTDUP - Records with the first duplicate instance of an On value
       LASTDUP - Records with the last duplicate instance of an On value
       ALLDUPS - All Duplicate Instances
       NODUPS - No Duplicate Instances
       HIGHER(x) - Records with On values that occur more than x times
       LOWER(x) - Records with On values that occur less than x times
       EQUAL(x) - Records with On values that occur x times
       FIRST - Records with On values that occur only once or the first instance of an On value
       LAST - Records with On values that occur only once or the last instance of an On value
       VSAMTYPE(x) - Specifies fixed or variable length record processing
       UZERO - Select unsigned zero processing

Fig. 7

810 ⤳
```
USR002  EISSLER  12 LIST
DFSRT2  EISSLER  05 PRODUCTION
DFSRT2  MORGAN   05 LIST
DFSRT5  MADRID   20 DATA
DFSRT1  MADRID   20 DATA
SYS003  MADRID   20 LIST
DFSRT2  MADRID   20 LIST
USR003  MADRID   20 LIST
```

820 ⤳
```
USR002  EISSLER  12 LIST
DFSRT5  MADRID   20 DATA
```

Fig. 8

METHOD, APPARATUS, AND SYSTEM FOR IMPROVED DUPLICATE RECORD PROCESSING IN A SORT UTILITY

BACKGROUND OF THE INVENTION

1. The Field of the Invention

The present invention relates to the sorting of data records. More particularly, the present invention relates to methods and apparatus for identifying and outputting specified instances of duplicate data records within a sorting utility.

2. The Relevant Art

Record sorting is a necessary and useful utility within data processing systems. Sorting facilitates the ordering of data records in a manner useful for processing applications such as searching data records, generating billing statements, creating reports, compiling directories, and the like. The ability to sort data records using one or more selected fields as a sorting key facilitates intelligent processing of data records.

While sorting is a useful operation, sorting data records and conducting operations associated therewith can consume large amounts of computational capacity, particularly when dealing with files containing a large quantity of data records.

Pipelined sorting systems have been developed to meet the performance demands of applications that process large files. Pipelined sorting systems achieve increased performance by partitioning a problem into stages, where each stage focuses processing resources on specific tasks. Typically, data records in the form of files are fed one record at a time into a processing pipeline. As each pipeline stage finishes processing a data record, the data record may be passed onto a subsequent stage for further processing.

Execution flexibility is one advantage of pipelined processing systems. The processing stages that are ready for execution may be distributed to available processors, while processing stages that are blocked may be suspended to provide processing capacity to other stages.

To increase processing efficiency, control statements associated with a set of data records may be parsed and packed into one or more control blocks prior to actual processing. The control blocks configure the various processing stages of a processing pipeline and facilitate efficient execution. Pipeline stages that are not referenced within control statements are preferably bypassed to eliminate unneeded record handling. The ability to control pipeline stages via control statements essentially provides a job-configurable virtual machine useful to developers and users of pipelined applications and utilities.

In addition to sorting, pipelined sorting systems may include features for selectively processing data records as directed by control statements associated with a set of data records. For example, IBM®'s DFSORT™ utility supports control statements corresponding to a skip stage, a user supplied input stage, a filtering stage, a stop stage, a first reformatting stage, a sort, copy, or merge stage, a second reformatting stage, a user supplied output stage, and one or more supplemental stages.

The skip stage skips or discards a selected number of the data records before passing unskipped records onto the rest of the pipeline. The user supplied input stage facilitates customized processing on the unskipped records or data records provided from programmable sources. The filtering stage filters the data records such that selected records are passed on to the remainder of the pipeline, while other records are discarded or redirected.

The stop stage passes a specified number of the data records to the remainder of the pipeline and thereby limits subsequent processing, such as sorting, to a specified number of data records. The first reformatting stage reformats data records and passes the formatted records to the sort, copy or merge stage. The second reformatting stage may also be used to apply additional formatting operations to the data records subsequent to the sort, copy or merge stage.

The user supplied output stage facilitates execution of customized processing on and data output of the processed data records. The supplemental processing stage may be used to conduct specialized formatting and reporting operations in order to generate multiple forms of output related to a set of data records.

The various stages included in the aforementioned sort utility were developed in response to the needs of developers and users. Each pipeline stage executes in an efficient manner and adds to the flexibility and power of the sort utility. The ability to draw upon the power and efficiency of the utility via control statements severely reduces the programming burden associated with creating customized applications such as generating billing statements, publishing directories, creating reports, and the like.

The files or record sets processed by a sorting utility such as the aforementioned pipelined sort utility often contain duplicate instances of data records. A system may require that only a limited subset of duplicate record instances be retained for further processing.

To address this need, sorting systems have included command statements to select all instances of duplicate data records, command statements to delete all instances of duplicate records, and command statements to select all instances of duplicate records that meet specified criteria. However, systems have been unable to directly select a particular instance of duplicate data records such as a first or last instance of a duplicate set of records. The ability to restrict processing to a particular instance would reduce the bandwidth, storage, and computational load associated with processing duplicate records.

Thus, the need exists in the art for a method, apparatus, and system capable of selecting a particular instance of duplicate data records such as a first or last instance and thereby improve the performance and effectiveness of data processing applications such as a pipelined sort utility.

SUMMARY OF THE INVENTION

The methods and apparatus of the present invention have been developed in response to the present state of the art, and in particular, in response to the problems and needs in the art that have not yet been fully solved by currently available data processing means and methods. Accordingly, the present invention provides an improved method, apparatus, and system for selecting records in files or record sets containing duplicate records.

In one aspect of the present invention, a method for identifying and selecting instances of duplicate data records that meet specified duplicate selection criteria includes sorting data records, identifying duplicate records, and selecting instances of duplicate records according to specified criteria. The duplicate record selection method sorts a set of data records. Records are sorted according to the values of data fields or descriptor words and criteria established by control statements.

Subsequently, the selection method identifies subsets of duplicate data records. The selection method selects at least one data record from each subset of duplicate data records. In one embodiment, control statements specify criteria for selecting a particular instance from each subset of duplicate records. For example, the first or last instance of each subset of duplicate records may be specified for selection.

In one embodiment, records that potentially meet duplicate selection criteria are saved. Saving records that potentially meet duplicate selection criteria allows the selection method to continue to process additional records in an efficient manner. The final selection may be deferred until all relevant records have been processed.

In one embodiment, the duplicate record sort method outputs selected records. Records may be output to multiple sort utility modules or to other elements in the systems. The selection method may identify the last record in a plurality of data records to determine the existence of a set of data records or the end of a subset of duplicate data records.

An apparatus of the present invention is also presented that is provided with modules to sort and select duplicate data records. These modules include a data I/O module, a data sort module, and a duplicate selection module. The data sort module sorts the data records. The duplicate selection module selects at least one instance of a set of duplicate data records according to specified duplicate selection criteria. For example, the apparatus may select the first or last instance of each set of duplicate records. Alternately, data records may be selected according to values of descriptor words or data fields. The data I/O module outputs select data records.

In one embodiment, control statements specify criteria for selecting instances of duplicate data records. The apparatus may save a data record when the data record has potentially met duplicate selection criteria. Saving records that potentially meet the duplicate selection criteria increases the efficiency of the pipelined sort utility. Saved data records may be overwritten or discarded if they ultimately do not meet the duplicate selection criteria. In one embodiment, the pipelined sort utility is configured to detect the last record in a set of data records.

A system of the present invention is also presented for selecting instances of duplicate records. In one embodiment, the system is a computer that includes a data sort module, a duplicate selection module, and a data I/O module. The data sort module sorts a set of data records. The duplicate selection module uses specific criteria to select instances of subsets of duplicate records. The data I/O module outputs selected duplicate instances.

In one embodiment, control statements specify duplicate selection criteria for selecting a specific instance of duplicate records. For example, the first or last instance of a set of duplicate records may be selected.

The system is configured to output saved records. An output data record is transferred to a module within the system or written to a system data bus. The system may delete records that are not selected. The system may output non-selected records to alternate destinations. In one embodiment, the system saves records that potentially meet duplicate selection criteria. Saving records that potentially meet duplicate selection criteria allows the system to continue processing records until a final selection is made.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 is a text-based diagram illustrating the syntax of one embodiment of a duplicate record selection method of the present invention; and FIG. 8 is a text-based diagram illustrating an example of the selection inputs and results for one embodiment of a first instance duplicate record selection method of the present invention.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
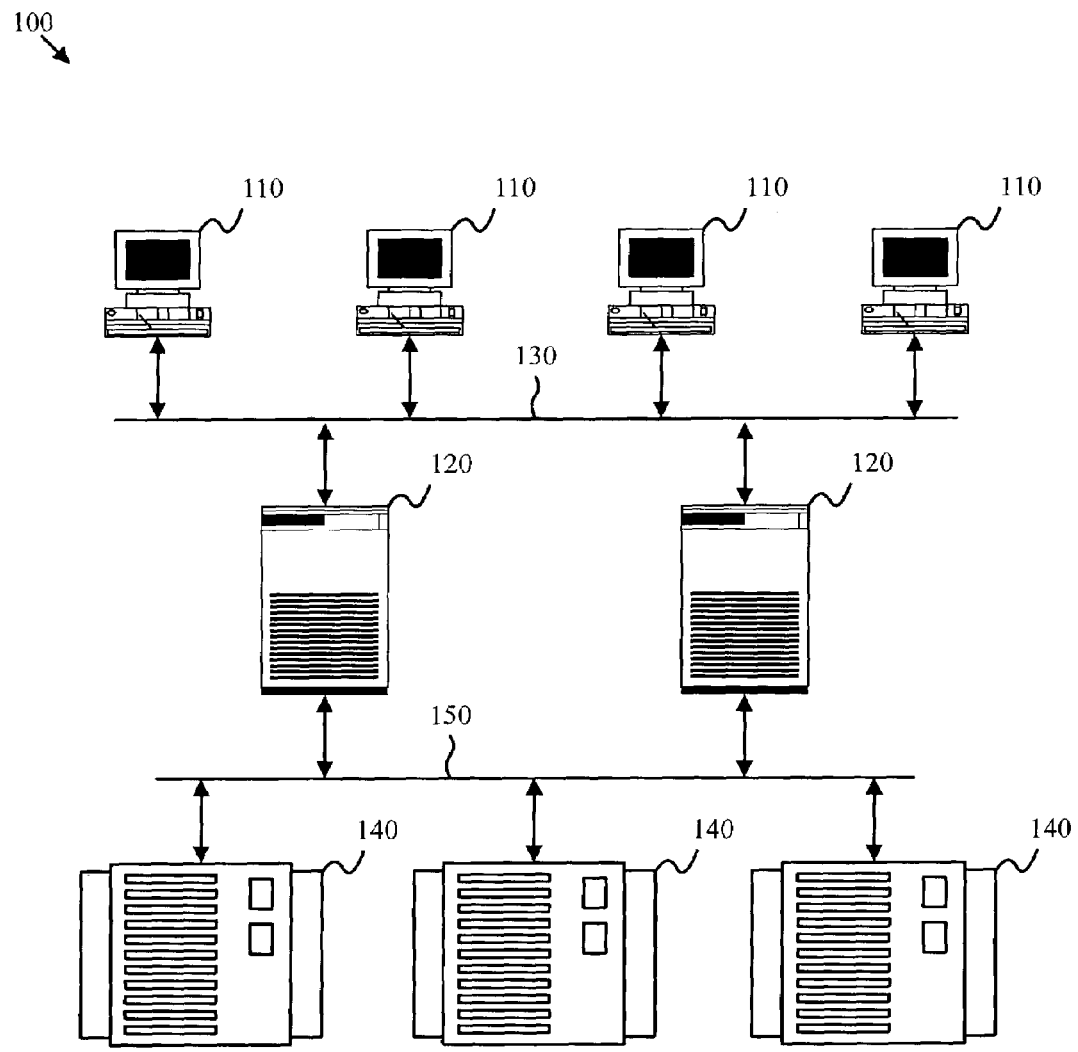
FIG. 1 is a block diagram illustrating a representative data processing system.

Referring to FIG. 1, a data processing system 100 is depicted that is representative of an environment in which the present invention may be deployed. The depicted data processing system 100 includes terminals or workstations 110 interconnected with one or more computers 120 via a network 130. The network 130 may be a local area network and/or a wide area network. Computers 120 may include mainframe computers.

The depicted data processing system 100 also includes one or more storage subsystems 140 interconnected with computers 120 via a storage network 150. The mainframe computers 120 are preferably configured to conduct high bandwidth input and output (I/O) with the storage subsystems 140. The storage subsystems 140 may include redundant components such as storage controllers and storage devices in order to increase reliability.

Figure 2:
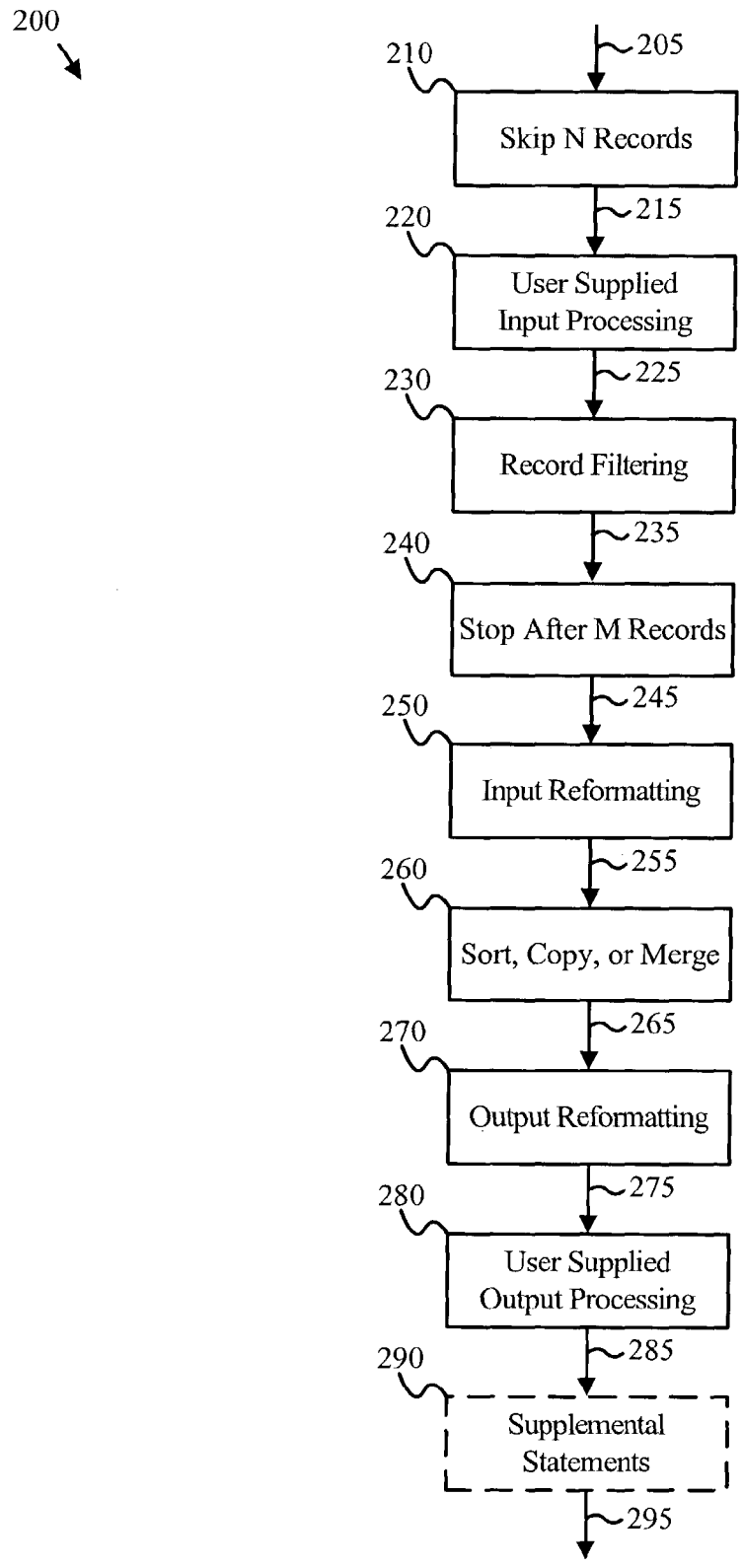
FIG. 2 is a data flow diagram illustrating one embodiment of a prior art data processing pipeline.

FIG. 2 is a data flow diagram of a prior art data pipeline 200 exemplary of the environment wherein the present invention may be deployed. The depicted diagram shows the preferred relationship of various processing stages of the data pipeline 200. The depicted data pipeline 200 of the depicted embodiment is essentially a job-configurable virtual machine that executes on a computer such as the mainframe 120 depicted in FIG. 1.

The data pipeline 200 facilitates efficient record-oriented processing such as copying, filtering, sorting, summing, formatting, and reporting on data records. Although the present invention was developed in response to the needs of the data pipeline 200 on the mainframe 120, the present invention may be deployed separately from the data pipeline 200 and the mainframe 120.

The data pipeline 200 processes data as directed by various control statements corresponding to the processing stages of the data pipeline 200. In one embodiment, multiple control statements corresponding to a set of data records are parsed and packed into one or more control blocks (not shown). The control blocks configure the various processing stages of the data pipeline 200 and facilitate execution of a scheduled job.

Typically, a set of data records 205 in the form of a file is fed one record at a time into the pipeline 200. However, each pipeline stage may process multiple records concurrently, particularly those stages that compare data from multiple records, such as the sort stage 260. Pipeline stages that are not used are preferably bypassed such that records from a previous stage are provided to a subsequent stage without processing by the bypassed stage.

As depicted, the data pipeline 200 includes a skip stage 210, a user supplied input stage 220, a filtering stage 230, a stop stage 240, a reformatting stage 250, a sort stage 260, a reformatting stage 270, a user supplied output stage 280, and one or more supplemental stages 290. Stages 210–250, and 270–290 are optional in that stages that are not referenced by control statements are bypassed within the data pipeline 200. For illustration purposes, the following description generally assumes that each stage is used within the data pipeline 200.

The skip stage 210 skips or discards a selected number of the data records 205 before passing unskipped records 215 onto the next stage of the data pipeline 200. A user supplied input stage 220 facilitates conducting user supplied processing routines on the unskipped records 215 and provides one or more data records 225. In one embodiment, the data pipeline 200 may be configured to receive data records 225 directly from the user supplied input stage 220 without use of the skip stage 210.

The filtering stage 230 filters the data records 225 such that selected records 235 are passed on to the remainder of the pipeline 200, while other records are discarded. The record filtering accomplished by the filtering stage 230 preferably occurs as directed by control statements associated with record filtering.

The stop stage 240 receives the selected records 235 from the filtering stage 230. The stop stage 240 passes a selected number of the data records 245 to the remainder of the data pipeline 200. In one embodiment, the selected number of data records 245 is indicated by a control block created from one or more control statements associated with a set of data records. After the selected number of records 245 have been supplied to the remainder of the data pipeline 200, the stop stage 240 indicates an end of data condition to the next stage in the data pipeline 200.

The reformatting stage 250 reformats data within the records 245 and passes formatted records 255 to the sort stage 260 which in turn provides sorted records 265. In addition to sort operations, the sort stage 260 may also be configured to merge or copy data records as specified by the control statements associated with the records being processed. The reformatting stage 270 applies additional formatting operations to the sorted records 265 to provide one or more formatted records 275.

The formatted records 275 are fed to the user supplied output stage 280. Upon completion of the customized processing provided by the user supplied output stage 280, one or more data records 285 are passed either to the supplemental processing stage 290, or alternately, directly to an output file 295. The supplemental processing stage 290 is configured to conduct multiple passes on the data records 285 and conduct specialized formatting and reporting operations in order to generate multiple forms of output related to the set of data records.

Figure 3:
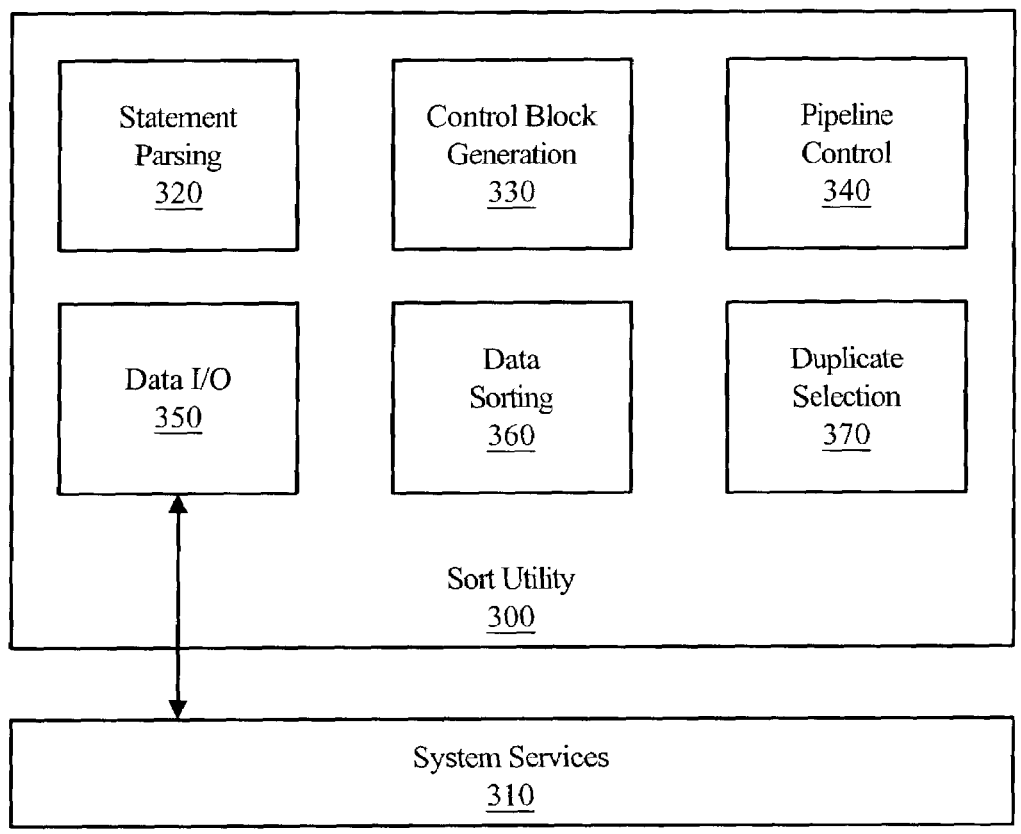
FIG. 3 is a block diagram illustrating one embodiment of a sort utility in accordance with the present invention.

FIG. 3 is a block diagram illustrating selected modules of a sort utility 300 in accordance with the present invention. The sort utility 300 provides record-oriented processing services such as sorting, merging, copying, summing, and formatting of data records. In one embodiment, the sort utility 300 is configured to provide record-oriented processing services to system utilities, operating system extensions, programming languages, applications, and the like.

In the depicted embodiment, the sort utility 300 includes a variety of modules useful for record-oriented processing. The functionality of the modules within the sort utility 300 is increased by the use of system services 310 such as those available within an operating system such as IBM®'s z/OS or OS390. The modules depicted in FIG. 3 include a statement parsing module 320, a control block generation module 330, a pipeline control module 340, a data I/O module 350, a data sorting module 360, and a duplicate selection module 370.

The sort utility 300 receives a set of control statements (not shown) that in one embodiment are used to configure the data pipeline 200 depicted in FIG. 2 via one or more control blocks (not shown). The statement parsing module 320 parses the control statements to ascertain various options and parameters related to the processing stages of the data pipeline 200. The control block generation module 330 encodes the parsed options and parameters into the control blocks used to configure the data pipeline 200.

The pipeline control module 340 coordinates execution and the movement of data between the stages of the data pipeline 200. As a data record finishes a pipeline stage it is directed to a subsequent stage. The data I/O module 350 provides I/O services to the sort utility 300 such as retrieving records to feed the pipeline and storing records processed by the pipeline.

The data sort module 360 sorts data records by descriptor words, descriptor values, or data field values. Sorting is done according to specified parameters. The duplicate selection module 370 provides services that facilitate selecting at least one data record from a plurality of duplicate data records. The duplicate selection module 370 may conduct methods that provide selected instances of duplicate data records to sort utility 300 or the data pipeline 200.

Figure 4:
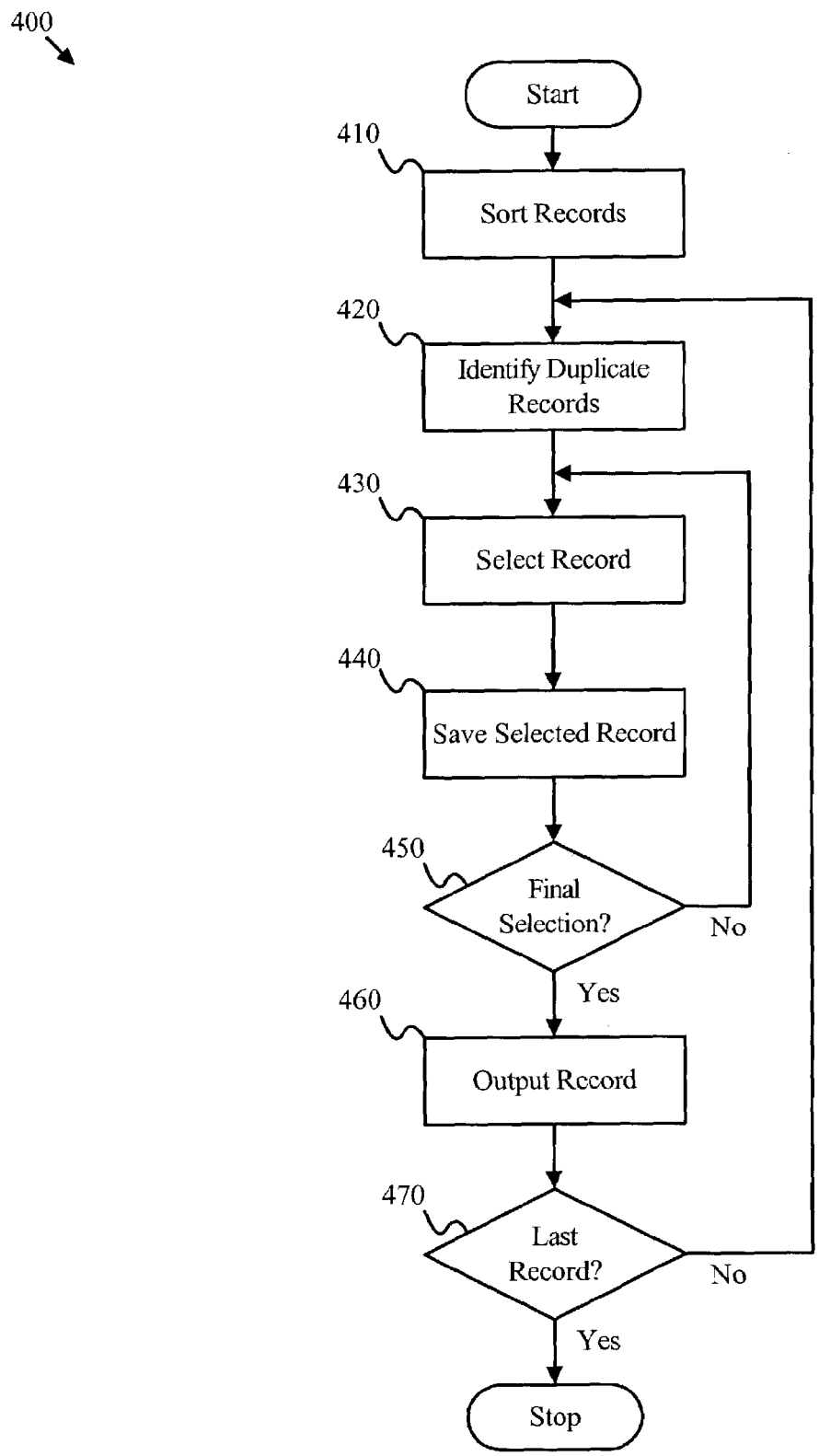
FIG. 4 is a block diagram illustrating one embodiment of a duplicate record selection method of the present invention.

FIG. 4 is a block diagram illustrating one embodiment of a duplicate record selection method 400 of the present invention. The selection method 400 facilitates the identification, selection, and distribution of instances of duplicate data records using specified duplication selection criteria from a plurality of data records in an efficient, pipelined operation.

As depicted, the selection method 400 includes a sort records step 410, an identify duplicate records step 420, a select record step 430, a save selected record step 440, a final selection test 450, an output record step 460, and a last record test 470. As depicted, the selection method 400 assumes that duplicate selection criteria received from the statement parsing module 320, or the like, are used to direct the selection method 400. Although for purposes of clarity the steps of the selection method 400 are depicted in a certain sequential order, execution within an actual system may be conducted in parallel and not necessarily in the depicted order.

The selection method 400 is typically invoked by a sort utility such as the pipelined sort utility 300. The sort records step 410 sorts a plurality of records. Data records may be sorted based on certain criteria such as a descriptor key, descriptor word, or data field value. In one embodiment, duplicate records are indexed sequentially. In an alternate embodiment, the duplicate records are stored sequentially. The selection method 400 may then treat sequential records with identical criteria, such as descriptor keys, descriptor words, or data fields, as duplicate records.

The identify duplicate records step 420 scans the sorted data records to identify sets of duplicate data. Multiple sets of duplicate records may be identified. The select record step 430 selects at least one instance of a data record from a plurality of duplicate data records based on duplicate selection criteria. In one embodiment, the select record step 430 essentially makes a preliminary selection that assumes that a record meets duplicate selection criteria (until otherwise informed), allowing the selection method 400 to continue processing records until a final selection is made.

The save selected record step 440 saves the selected record, including records that potentially meet the duplicate selection criteria. In one embodiment, the save record step 440 saves an index value of the selected record to a memory location. Alternately, the entire record may be written to a memory location. In one embodiment, the save selected record step 440 writes the subsequent saved record over previously saved records. In an alternate embodiment, multiple selected instances are saved. Saving a record that potentially meets duplicate selection criteria allows the selection method 400 to continue processing subsequent records efficiently until a final record selection is made.

The final selection test 450 determines whether additional duplicate records must be processed before a final selection can be made. If the saved record is not known to be the final selection, the sort method loops to the select record step 430. If the saved record is known to be the final selection, the selection method 400 proceeds to the output record step 460. In one embodiment, a record is known to be a final selection when a non-duplicate record is encountered or an End-of-File condition occurs.

The output record step 460 outputs at least one saved (i.e. selected duplicate) data record. Outputted records may be indexed, flagged, written to memory, or communicated to other subsystems or modules. The last record test 470 determines if the current data record is the last data record of the plurality of records. If the current record is not the last record, then the selection method 400 loops to the identify duplicate records step 420. If the last record test 470 determines the current record is the last record of a plurality of data records, then the selection method 400 terminates.

Figure 5:
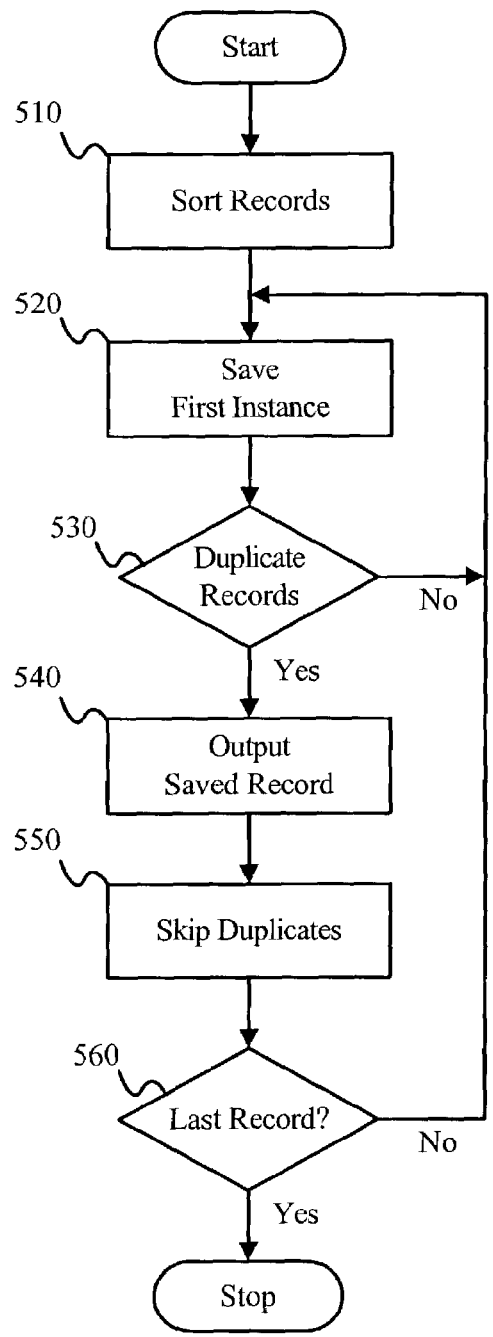
FIG. 5 is a block diagram illustrating one embodiment of a first instance duplicate record selection method of the present invention.

FIG. 5 is a block diagram illustrating one embodiment of a first instance duplicate record selection method 500 of the present invention. The selection method 500 facilitates the identification, selection, and distribution of the first instance of duplicate data records from a plurality of data records.

The selection method 500 is typically invoked from a sort utility such as the pipelined sort utility 300. As depicted, the selection method 500 includes a sort records step 510, a save first instance step 520, a duplicate records test 530, an output saved record step 540, a skip duplicates step 550, and a last record test 560. Although for purposes of clarity the steps of the selection method 500 are depicted in a certain sequential order, execution within an actual system may be conducted in parallel and not necessarily in the depicted order.

The sort records step 510 sorts a plurality of data records. Data records are indexed or saved in sequential order according to certain criteria such as the value of a descriptor key, descriptor word, or data field value. The save first instance step 520 saves the first instance of potential set of duplicate data records. The selection method 500 cannot determine if a record is the first instance of a set of duplicate data records without processing subsequent records. Saving the first instance of a potential set of duplicate records enables the selection method 500 to continue processing records until a duplicate record set is definitively identified.

The duplicate records test 530 determines if the subsequent record is an instance of the same set of duplicate data records as the saved record. If the subsequent record is not an instance of the same duplicate data set as the saved record, the duplicate records test 530 loops to the save first instance step 520. If the saved record is part of a set of duplicate data records, the identify duplicate records test 530 proceeds to the output saved record step 540.

The output saved record step 540 outputs the saved first instance of a set of duplicate data records. Outputted records may be indexed, flagged, written to memory, or communicated to other subsystems or modules. The skip duplicates step 550 scans the remaining duplicate records to the end of a set of duplicate data records.

The last record test 560 determines if the last record in a duplicate record set is also the last record in the plurality of data records. If the last record test 560 determines records remain to be processed, the last record test 560 loops to the save first instance step 520. If the last record test 560 determines all records have been processed, the sort method 500 terminates.

Figure 6:
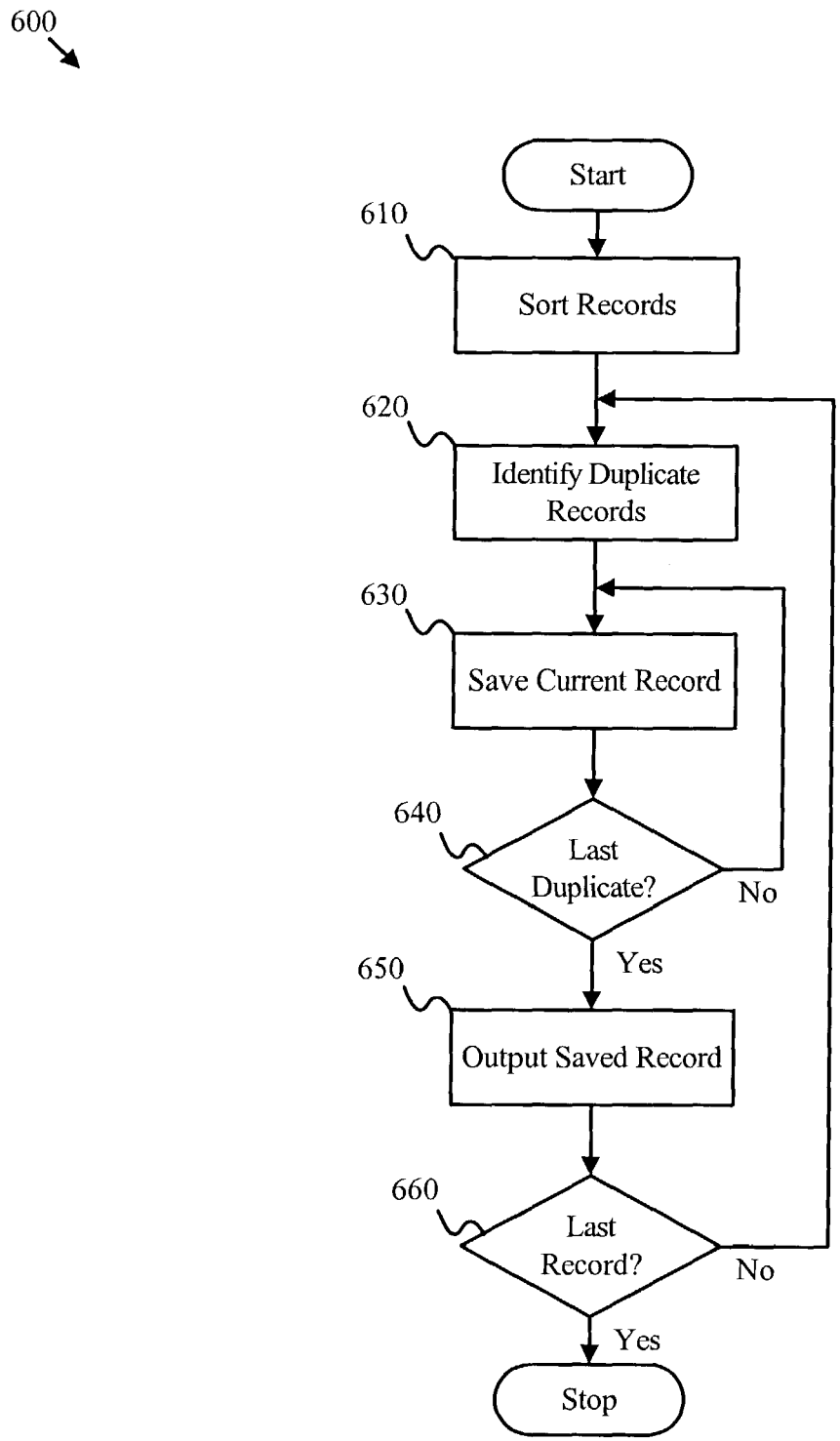
FIG. 6 is a block diagram illustrating one embodiment of a last instance duplicate record selection method of the present invention.

FIG. 6 is a block diagram illustrating one alternate embodiment of a last duplicate record selection method 600 of the present invention. The selection method 600 facilitates the identification, selection, and distribution of the last instance of duplicate data records from a plurality of data records.

The selection method 600 is typically invoked from a sort utility such as the pipelined sort utility 300. As depicted, the sort method 600 includes a sort records step 610, a identify duplicate records step 620, a save current record step 630, a last duplicate test 640, an output saved record step 650, and a last record test 660. Although for purposes of clarity the steps of the selection method 600 are depicted in a certain sequential order, execution within an actual system may be conducted in parallel and not necessarily in the depicted order.

The sort records step 610 sorts a plurality of data records. Data records are indexed or saved in sequential order according to certain criterion, such as the value of a descriptor key, descriptor word, or data field value. The identify duplicate records step 620 identifies the second record of a set of duplicate records. In one embodiment, the identify duplicate records step 620 identifies the second record of a set of duplicate records by scanning until two adjacent duplicate records are encountered. Records that are not the second record of a duplicate record set may be deleted.

The save current record step 630 saves the current duplicate record of a set of duplicate records. The current duplicate record is potentially the last instance of a set of duplicate records. Saving the current duplicate record allows the selection method 600 to continue processing records until making a final determination of the identity of the last duplicate record in a duplicate record set.

The last duplicate test 640 determines if the subsequent record is a member of the set of duplicate records. If the subsequent data record is a member of the set of duplicate records, the last duplicate test 640 loops to the save current duplicate record step 630. If the subsequent data record is not a member of the set of duplicate records, the last duplicate test 640 proceeds to the output saved record step 650.

The output saved record step 650 outputs the saved last instance of the set of duplicate data records. Outputted records may be indexed, flagged, written to memory, or communicated to other subsystems or modules.

The last record test 660 determines if there is a subsequent data record. If there is a subsequent data record, the last record test 660 proceeds to the identify duplicate records step 620. If there is not a subsequent data record, the last record test 660 terminates the selection method 600.

FIG. 7 is a text-based diagram illustrating the syntax of one embodiment of a duplicate selection control statement 700 of the present invention. For illustration purposes, the depicted syntax is shown in a simplified form. A more detailed description of the depicted syntax is contained within release 14 of IBM®'s "DFSORT Application Programming Guide" which is incorporated herein by reference.

The selection control statement 700 specifies various options and parameters related to the sort, copy, or merge module 260, the data I/O module 350, the date sorting module 360, and the duplicate selection module 370. The depicted selection control statement 700 includes a selection command 710, a source indicator 720, a destination indicator 730, one or more sort parameters 740 including a position indicator 750, a length indicator 760, and a format indicator 770, and an operation indicator 780.

The selection command 710 is a keyword, which identifies the command statement as performing data selection. In the depicted embodiment, the selection command 710 is a keyword 'select'. The source indicator 720 specifies the source of data records, including data tables, data files or memory locations. In the depicted embodiment, the source indicator 720 includes the keyword 'from' followed by a source identifier within parenthesis. The destination indicator 730 specifies the destination for outputting data records. In the depicted embodiment, the destination indicator 730 includes the keyword 'to' followed by a destination identifier within parenthesis.

The sort parameters 740 include parameters indicating that a specified portion of a data field will be used in sorting data for the duplicate selection method 400. In the depicted embodiment, the sort criteria indicator 740 includes the keyword 'ON' followed by the position, length, and format indicators 740, 750, and 760 enclosed within parenthesis. The position, length, and format indicators 740, 750, and 760 identify the starting position, length, and format of the data field to be selected as a sorting key.

The operation indicator 780 specifies the duplicate selection criteria to be used in selecting instances of duplicate records. In the depicted embodiment, the operator indicator 780 may be used to specify that the first instance of a set of duplicate records is selected by using the 'FIRSTDUP' keyword as the operation indicator 780. Alternately, in the depicted embodiment, the operator indicator 780 may be used to specify that the last instance of a set of duplicate records is selected by using the 'LASTDUP' keyword as the operation indicator 780.

FIG. 8 is a text-based diagram illustrating an example of the selection inputs and results of one embodiment of a first instance duplicate record selection method 500 of the present invention. In the depicted examples, the first instance duplicate record selection method 500 sorts the data records 810 using the second element of each data record. The selection method 500 may then output the first instances of records 820 containing second data elements that are duplicated in other records. Other duplicate instances and records without duplicate second data elements may be deleted or output to alternate destinations.

The present invention improves and facilities the processing of duplicate data records by selecting at least one instance of duplicate records according to duplicate selection criteria specified by a command statement in order to reduce a set of duplicate data records to those selected for further processing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for selecting a specified data record from a plurality of duplicate data records, the method comprising:

identifying duplicate records within a plurality of records, the duplicate records having a key field having the same data value and least one other field having different data values;

scanning control statements for a duplicate selection criteria;

selecting at least one data record from among the identified duplicate records as specified by a duplicate selection criteria; and outputting the at least one data record.

2. The computer-implemented method of claim 1, wherein the duplicate selection criteria specifies selecting a last duplicate data record from a plurality of duplicate records.

3. The computer-implemented method of claim 1, wherein the duplicate selection criteria specifies selecting a first duplicate data record from a plurality of duplicate records.

4. The computer-implemented method of claim 1, further comprising saving a selected duplicate record.

5. The computer-implemented method of claim 1, further comprising deleting non-selected records.

6. The computer-implemented method of claim 1, further comprising identifying a last data record of a plurality of duplicate records.

7. An apparatus for selecting a specified data record from a plurality of duplicate data records comprising a plurality of modules configured to communicate within a computing system, the modules comprising:
  a parser configured to scan control statements for duplicate selection criteria;
  a duplicate selection module to select at least one data record from a plurality of duplicate records as directed by the duplicate selection criteria, the duplicate records having a key field having the same data value and least one other field having different data values; and
  a data I/O module to output the at least one data record.

8. The apparatus of claim 7, wherein the duplicate selection module is further configured to save a selected data record.

9. The apparatus of claim 7, wherein the duplicate selection module is further configured to initiate output of a saved data record.

10. The apparatus of claim 7, wherein the duplicate selection module is further configured to delete non-selected records.

11. The apparatus of claim 7, wherein the duplicate selection module is further configured to identify a last data record of the plurality of duplicate data records.

12. An apparatus for sorting duplicate data records, the apparatus comprising:
  means for sorting a plurality of duplicate data records, the duplicate records having a key field having the same data value and least one other field having different data values;
  means for scanning control statements for a duplicate selection criteria;
  means for selecting at least one data record from the plurality of duplicate records as specified by the duplicate selection criteria; and
  means for outputting selected data records.

13. A system for processing data records, the system comprising:
  a computer;
  a data sort module sorts a plurality of data records;
  a duplicate selection module selects from the sorted plurality of data records at least one data record from a plurality of duplicate records as directed by duplicate selection criteria, the duplicate records having a key field having the same data value and least one other field having different data values, the duplicate selection module scanning control statements for the duplicate selection criteria; and
  a data I/O module configured to output the at least one data record.

14. The system of claim 13, wherein the duplicate selection module is further configured to temporarily save a selected data record.

15. The system of claim 13, wherein the duplicate selection module is further to configured to delete non-selected records.

16. The system of claim 13, wherein the duplicate selection module is further configured to identify and save records that potentially meet the duplicate selection criteria.

17. A computer program product in a computer system, said computer program product comprising a plurality of computer executable instructions recorded on a signal-bearing media, wherein said instructions, when executed by the computer, cause the computer to perform operations for selecting a specified data record from a plurality of duplicate data records, the operations configured to:
  scan control statements for duplicate selection criteria;
  identify duplicate records, the duplicate records having a key field having the same data value and least one other field having different data values;
  select at least one data record from a plurality of duplicate records as directed by the duplicate selection criteria; and
  output the at least one data record.

* * * * *